United States Patent
Djuric

(10) Patent No.: US 6,929,222 B2
(45) Date of Patent: Aug. 16, 2005

(54) NON-JAMMING, FAIL SAFE FLIGHT CONTROL SYSTEM WITH NON-SYMMETRIC LOAD ALLEVIATION CAPABILITY

(75) Inventor: Mihailo P. Djuric, 8127 Morningside, Wichita, KS (US) 67207-1124

(73) Assignee: Mihailo P. Djuric, Wichita, KS (US)

( * ) Notice: Subject to any disclaimer, the term of this patent is extended or adjusted under 35 U.S.C. 154(b) by 0 days.

(21) Appl. No.: 10/657,410

(22) Filed: Sep. 8, 2003

(65) Prior Publication Data

US 2005/0051671 A1 Mar. 10, 2005

(51) Int. Cl.[7] .............................................. B64C 13/14
(52) U.S. Cl. ..................................... 244/220; 244/232
(58) Field of Search ................................. 244/220, 229, 244/232, 233

(56) References Cited

U.S. PATENT DOCUMENTS

| | | | | |
|---|---|---|---|---|
| 1,366,917 A | * | 2/1921 | Latham ...................... 244/233 |
| 1,533,222 A | * | 4/1925 | Cashman ................... 244/233 |
| 1,808,342 A | * | 6/1931 | Chilton ...................... 244/232 |
| 1,809,936 A | * | 6/1931 | Hilburn .................... 74/471 R |
| 1,817,204 A | * | 8/1931 | Petersen ..................... 244/229 |
| 2,340,237 A | * | 1/1944 | Upson ........................ 244/232 |
| RE23,143 E | * | 8/1949 | Copeland ................... 244/233 |
| 2,573,044 A | * | 10/1951 | Morris ....................... 244/232 |
| 2,608,104 A | * | 8/1952 | Vogel et al. .............. 74/471 R |
| 2,773,659 A | * | 12/1956 | Feeny ....................... 244/76 R |
| 3,223,366 A | * | 12/1965 | Snook, Jr. ................. 244/90 R |
| 3,738,594 A | * | 6/1973 | Donovan et al. ......... 244/76 R |
| 3,754,727 A | * | 8/1973 | Donovan .................. 244/90 R |
| 3,919,897 A | * | 11/1975 | Yang ..................... 74/501.5 R |
| 3,936,014 A | * | 2/1976 | Morin ........................ 244/232 |
| 3,949,958 A | * | 4/1976 | Richter ...................... 244/227 |
| 4,192,476 A | * | 3/1980 | Byers ......................... 244/235 |
| 4,533,096 A | * | 8/1985 | Baker et al. .............. 244/75 R |
| 4,776,543 A | * | 10/1988 | Stableford .................. 244/232 |
| 4,967,984 A | * | 11/1990 | Allen ........................ 244/35 R |
| 5,100,081 A | * | 3/1992 | Thomas .................... 244/75 R |
| 5,538,209 A | * | 7/1996 | Bowden et al. ............. 244/221 |
| 5,806,806 A | * | 9/1998 | Boehringer et al. ........ 244/196 |
| 2003/0183728 A1 | * | 10/2003 | Huynh ....................... 244/224 |

* cited by examiner

Primary Examiner—Teri Pham Luu
Assistant Examiner—Stephen A Holzen

(57) ABSTRACT

A non-jamming fail safe flight control system with non-symmetric load alleviation capability includes a dual cable control system one for each side of control surface, like an elevator or an aileron, controlled by a pilot but driven by a driving system which allows control surfaces to even out the load from one side to the other without affecting pilots control while—if one side becomes jammed—enabling the pilot, with no extra action, to continue flying the aircraft utilizing the other side. In another embodiment an automatic lock feature ensures that a pilot is able to continue to complete the flight in case of severance of a control cable due to a discrete damage without interruption attributable to the control system. Yet another embodiment utilizing either the same or a separate locking feature enables the pilot to lock the surfaces upon parking the aircraft.

10 Claims, 6 Drawing Sheets

VIEW I – I

VIEW I - I

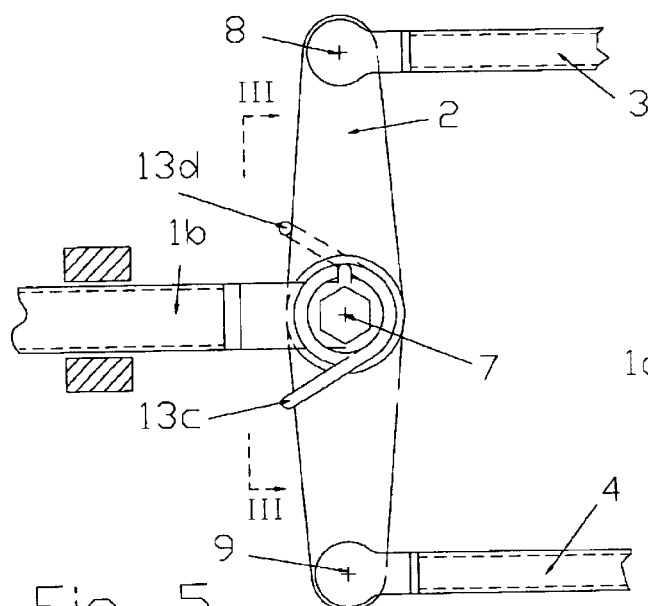
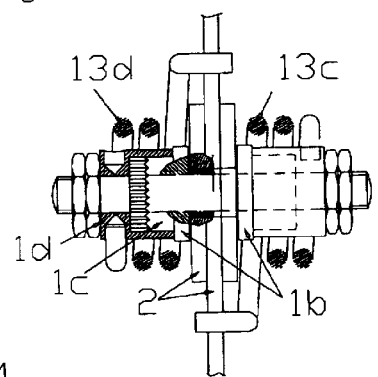
Fig. 5  Fig. 5A  VIEW III – III
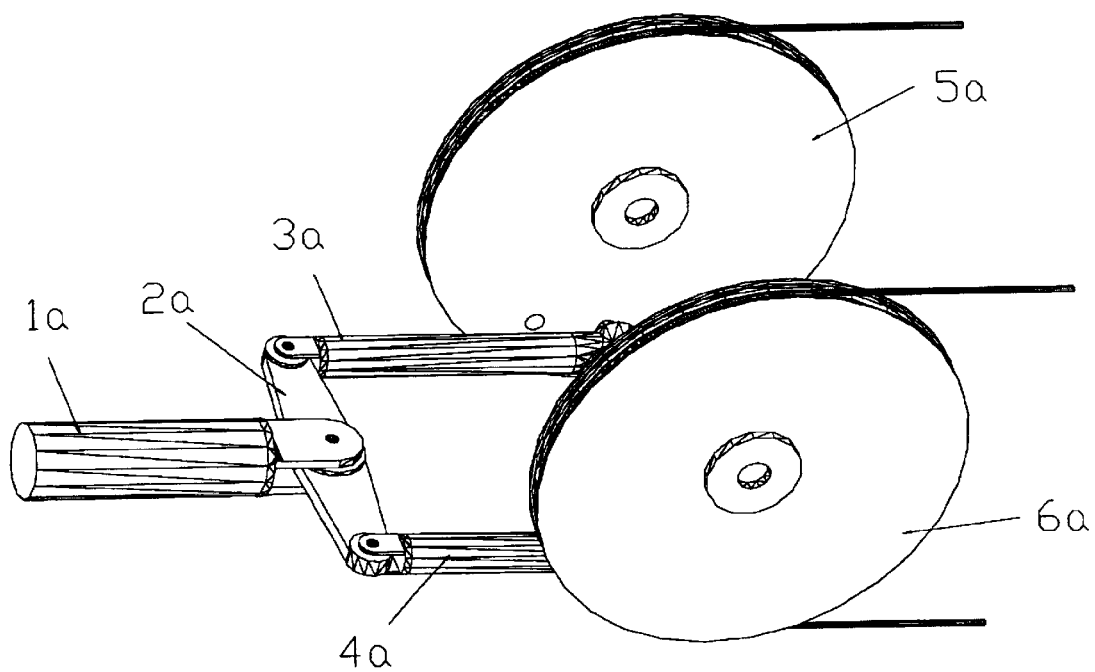
Fig. 6

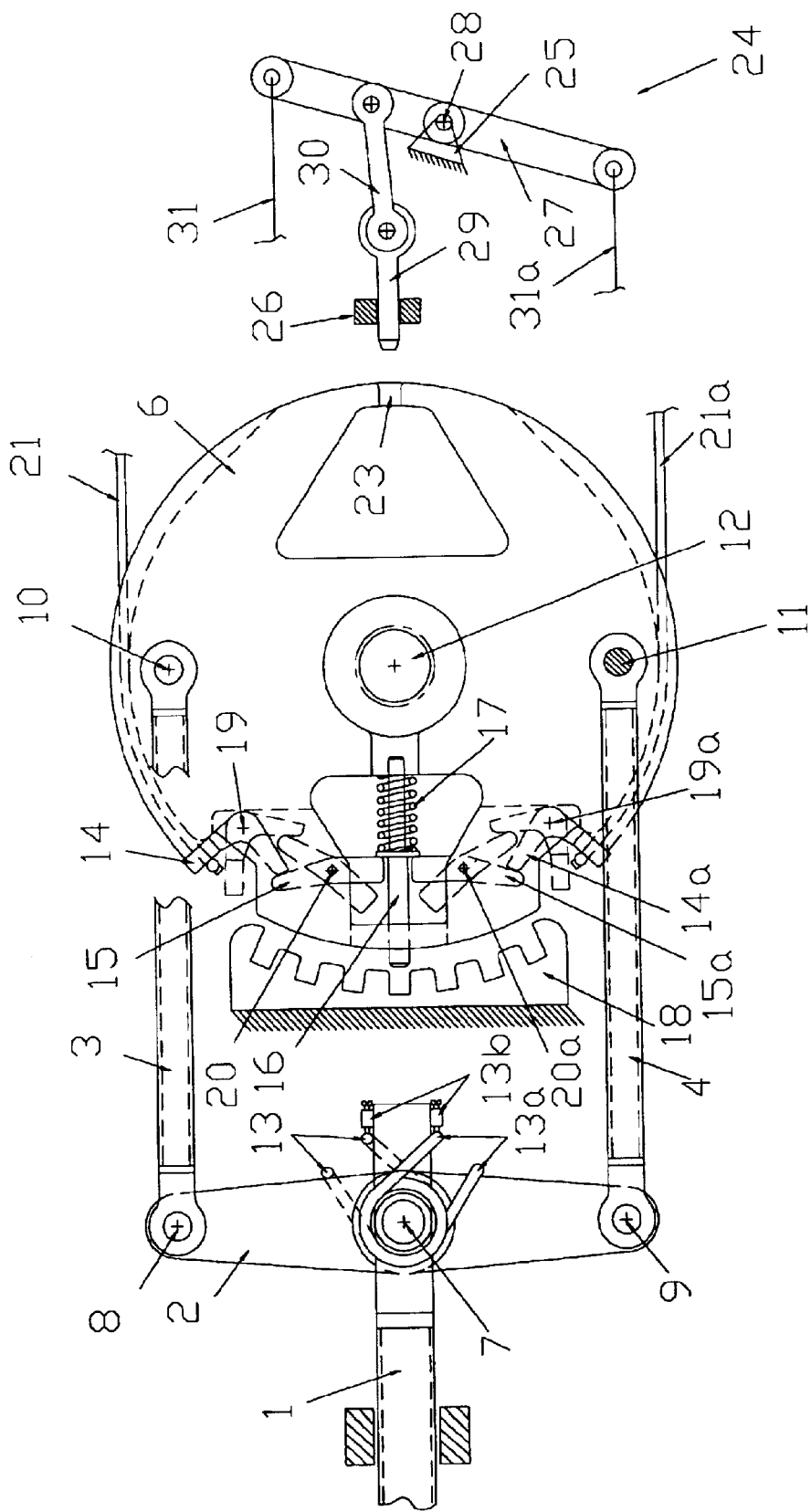

VIEW III - III

NON-JAMMING, FAIL SAFE FLIGHT CONTROL SYSTEM WITH NON-SYMMETRIC LOAD ALLEVIATION CAPABILITY

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, TABLE, OR A COMPUTER PROGRAM LISTING; COMPACT DISK APPENDIX

Not Applicable.

BACKGROUND OF THE INVENTION

It has been well recognized throughout the aircraft industry that, especially in the actuation of primary flight control surfaces, a failure mode causing the surface to be jammed can have catastrophic consequences.

Some current designs have employed a shear pin to join two separate control systems whereby in a case that one system becomes jammed a pilot would, by applying extra force on controls, cause the shear pin to shear thus permitting the pilot to continue controlling the flight utilizing the other side.

Some other designs utilize a dual control system one each on pilot and copilot side whereby a disconnect strut or a torque tube disconnect between the two systems is used. For example, the torque tube disconnect is shown in U.S. Pat. No. 5,782,436, dated Jul. 21, 1998. According to this patent the disconnect may be activated by pulling (or pushing) on the control column only from a non-jammed side. However, it requires a large force to do it. The FAA regulation require that the control system be certified for ultimate pilot effort load from not less than 150 lbs to as much as 450 lbs. At least 75% of that load must be carried thru a disconnect system before the system is disconnected (Ref. FAR 25.397 and 25.399). In the worst-case scenario assume the first pilot is in command and his side of control surface is jammed. First, he tries to control the aircraft but soon realizes he cannot. Second, he suspects a control jam but does not know which side may be jammed. Third, he pulls hard on control column trying to activate a disconnect from his side but still nothing happens. Fourth, he calls on copilot for help. Fifth, copilot acting from un-jammed side has to apply a significant force on control column to activate the disconnect. Sixth, once a disconnect is achieved only the copilot would be able to continue flying the aircraft. He may also face a possibility of dynamic over-control because of a sudden release of force following the disconnect.

All these designs have a common problem requiring an extra pilot effort, a delay in controlling and possible over-control of the aircraft in a dynamic action following the pin shear or a disconnect. In a critical phase of flight these problems may cause unpredicted consequences. Another drawback of many such designs is that it is irreversible during the flight; once the shear pin is sheared or disconnect is achieved the system cannot be converted back to the original configuration until landing and then resetting the system.

In addressing the fail safe problem there are control systems which retain the control when one of the cables breaks. Some use spring mechanism to operate as a single cable control system. In this case the spring rotates the pulley in one direction and remaining cable operates against the spring in the other direction. Other cable control systems disconnect the failed system so that a redundant system may be operated. Both designs require much higher cable tension forces then normal to operate.

BRIEF SUMMARY OF THE INVENTION

The primary object of this invention is to provide a non-jamming flight control system by which either pilot can continue to control the aircraft despite jamming of one side with no extra effort, no delay in action and no threat of over-controlling the aircraft as a result of jamming.

The invention is equally applicable to the elevator and aileron cable control systems and is primarily intended for the higher end of general aviation aircraft, especially those requiring transport or commuter category certification, but it can be used elsewhere also. In cases where larger forces are required, instead of pilot directly controlling the driving system a hydraulic actuator controlled by the pilot may be used to drive said driving system also. The invention may find its usage in a split surface rudder system as well.

In one exemplary embodiment, the non-jamming feature is provided by a driving system using a system of pivoting bellcrank and rod links with ability to drive each control system by its translational as well as by pivotal movement of said bellcrank. In a normal operation a translational movement of the bellcrank operates both surfaces. If a jam occurs on one side the cockpit control load input will force said bellcrank to pivot about its jammed side thus operating the non—jammed side without interruption. Additional feature of this driving system is that if recovery occurs, for example if the jamming was caused by accumulation of ice which latter dissipates or melts away, the system reverts to normal operation without intervention.

Additional benefit of the invention is that it may provide an automatic force balance between the two surfaces in case that a gust, a maneuver, a side slip or a wake produces a higher load on one of the surfaces, whereby the higher loaded surface will decrease while the other side will increase the deflection so that a balance is restored without requiring pilot intervention. This feature may especially be useful in case of the aileron control system by increasing the rolling stability of the aircraft. An installation of a spring or springs within said driving system, as explained latter, may moderate or eliminate this feature if desired by selecting appropriate spring stiffness.

In another embodiment of the invention a driving system utilizes differential gearing to perform the same function as described above should a jam occur. Planetary pinions work as a wedge between the two bevel-geared pulleys in normal operation, while during a jam they roll over the frozen gear thereby driving the other gear that operates the non-jammed side.

It is a further feature of this invention to secure continuous operation of the flight following a severance of a cable due to foreign object damage by employing a mechanical or electrical locking system triggered by lost tension in the cables connecting that system. Said locking system locks the pulley associated with failed cable. Once said pulley is locked, the driving system operates the control system on the other side as described before in a jammed condition. Of course, these systems are required only if a threat of discrete damage to a control system exists.

Yet another benefit of the invention is that, in case of an elevator control system, a dual control system does not necessarily have to be carried throughout the length of the fuselage, but only through an area where a possibility of damage to the controls may exist, for example throughout the engine rotor burst area, offering a possibility of some weight savings.

If said mechanical locking system is utilized, two identical systems are installed within each driving pulley, each comprising a system of pivotal linkages, a radially operable pin actuated by a compressed spring and a fixed receptacle located next to said pulley to which said pin can engage to lock said pulley in place. Each said system of pivotal linkages is connected at one end to the end of a cable, while the other end holds said pin in retracted position so that said pin can be released only when both cables of that control system lose required tension and that can only happen if a cable is broken. An electrical locking system is described latter below.

Yet another feature of this invention provides gust locks, operated by pilot command input, that secure said control surfaces in neutral position when the aircraft is parked. A mechanical or electrical gust lock design is herein offered.

A mechanical gust lock option comprising a pivotally supported beam operatively connected to receive the control input, a guided axially movable pin and a link operatively connected to said beam and said pin so that pivotal movement of the beam extends or retracts said pin, whereby in extended position said pin engages in a hole of said pulley thus locking the control system provided a pilot has also brought the cockpit control in neutral position.

Alternately, an electrical gust lock option comprising a polarized solenoid operated pin, a gust lock switch and a source of direct current, all connected in an electric circuit so that when said switch is commanded to a lock position said solenoid extends the pin into a hole provided in said pulley thus locking the control system. Once the system is locked power may be cut off. Moving said gust lock switch to unlock position would supply the power to said solenoid with reversed polarity thus causing said pin to retract and free the control system.

If said electrical locking system is employed both a gust lock function and a function performed by said mechanical locking system are combined together. Said electrical locking system comprising a solenoid operated pin located next to said pulley, two sensors within a pulley, a relay, a gust lock switch and a source of direct current all connected in an electric circuit. Said sensors, which may be simple micro switches, wired in series and sensing a lost tension in said cables would activate the relay to supply the power to said solenoid. Solenoid would then extend said pin into a hole within said pulley and lock the pulley in place. In a normal operation said relay is not powered and while in this state it supplies the power to the gust lock switch that operates as described above.

BRIEF DESCRIPTION OF SEVERAL VIEWS OF THE DRAWING

FIGS. 5 and 5A presents an alternate design of said driving system showing an adjustable spring preload design performing the same function as shown in FIGS. 2 and 9.

FIG. 6 presents a perspective view of elements 1*a* thru 4*a* in an alternate position relative to the pulleys 5 and 6 shown in FIGS. 1 and 2.

FIG. 9 presents a mechanical locking system that locks a pulley that becomes detached following a severance of a cable connected to that pulley.

FIG. 10 presents a mechanical gust lock 24 that locks the controls after the aircraft is parked.

DETAILED DESCRIPTION OF THE INVENTION

Figure 2:
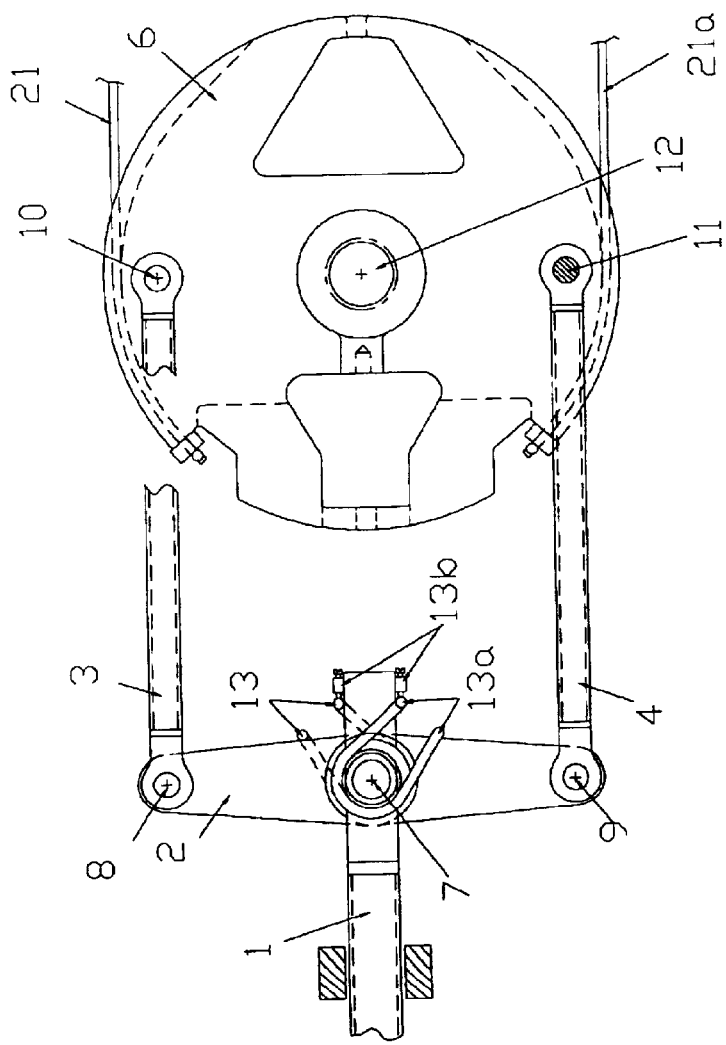
FIG. 2 presents the View I—I from FIG. 1 showing the driving system comprising elements 1 thru 4.
Figure 3:
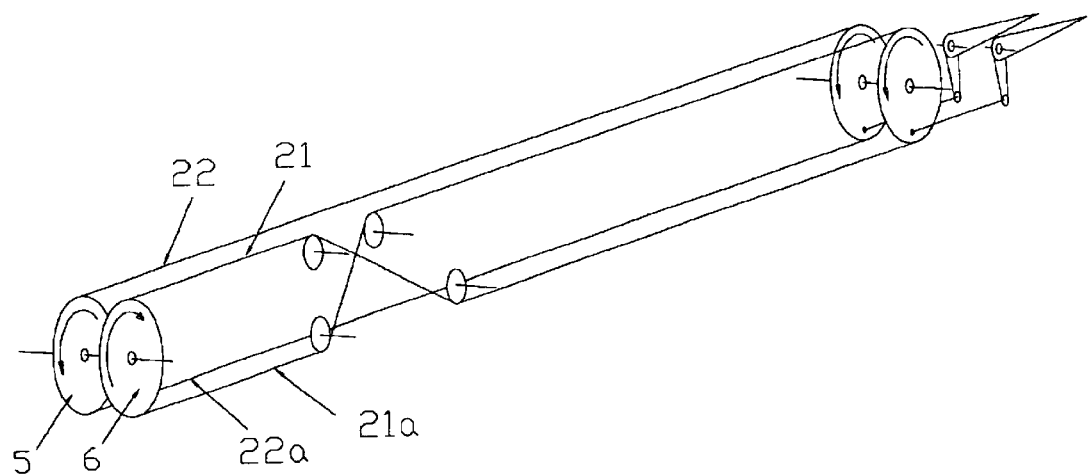
FIG. 3 presents a typical elevator control cable system with necessary crossover routing when employing the invention described in FIGS. 1 and 2.

A preferred driving system shown in FIG. 2 includes at least elements 1 thru 4. When said control input (for example the pilot/copilot flight control load input) is imparted on axially movable element 1 of said driving system, said two-arm bellcrank 2 and said output members—the rod links 3 and 4—operate said pulleys 5 and 6 causing them to rotate about said axle 12. Joints 7 thru 11 are pivotal joints. Each pulley 5 and 6 being coaxial but independently rotatable about said axle 12—by means of control cables 21, 21*a*, 22 and 22*a* operates one control surface, for example, the elevator left or right control surface as schematically shown in FIG. 3, even though the invention is equally applicable to the operation of the aileron control surfaces as well. Furthermore, irrespective of the pilot control input and provided springs 13 and 13*a* are not utilized, so long as the aerodynamic forces acting on the left and right control surfaces during flight are equal, the left and right control systems, which are connected thru the bellcrank 2, remain balanced and the bellcrank 2 does not pivot around the axis 7. When not pivoting, the bellcrank 2 maintains an equal deflection of both surfaces as dictated by the pilot input. Since the aerodynamic forces acting on deflected surfaces are directly proportional to surface deflections, should the unbalance of these forces between two surfaces occur at any time and for any reason—for example due to a gust, maneuver, slip stream effect, etc.—the surface experiencing momentarily higher load would reduce its deflection thus forcing the bellcrank 2 to rotate around pivot 7 causing the other surface deflection to increase until the system is balanced again. This self-aligning action is occurring automatically without influencing the pilot input at all. By utilizing springs 13 and 13*a* that resist the pivoting action of bellcrank 2, the magnitude of unbalance may be moderated. Said spring preload adjustment mechanism is represented here by a screw mechanism 13*b* attached to element 1 that allows for a small preload adjustment of each spring. A larger spring preload adjustment mechanism is shown in FIGS. 5 and 5A.

Should one control system—either left or right—becomes jammed, the pulley that normally operates that side will become stationary thus preventing the movement of that side of the pivoting bellcrank 2 by means of a connecting rod link. Any further pilot control input causing the axially moving element 1 to move would cause the bellcrank 2 to pivot about the stationary side of the bellcrank 2 allowing the operation of the non-jammed surface in a normal manner. There would be no interruption to the normal operation of controls, no extra pilot effort, no over-control possibility and no need to hand over the flight controls to a copilot—any of which may produce undesirable consequences. In a jammed situation, for any given cockpit control movement, the non jammed surface would deflect twice as much as it would under normal operation thus producing about the same aerodynamic effect in controlling the aircraft as would be when both surfaces operate. As a consequence, pilot's feel of force on controls remains about the same also. If during a flight the control system becomes unjammed, for example if the icing was the cause of jamming and the ice melts, the system reverts back to normal operation without requiring any pilot's action whatsoever.

Figure 1:
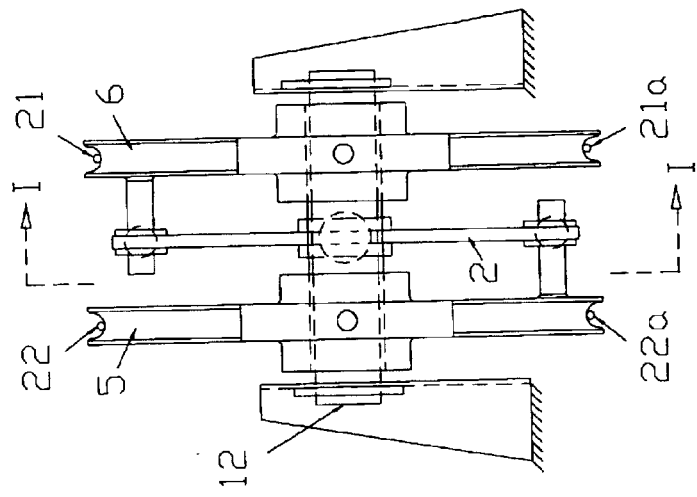
FIG. 1 presents the front view of pulleys 5 and 6 each of which drives one side of the control surface (not shown) by means of cables 21, 21*a*, 22, and 22*a* and a bellcrank 2 that drives the pulleys 5 and 6.
Figure 4:
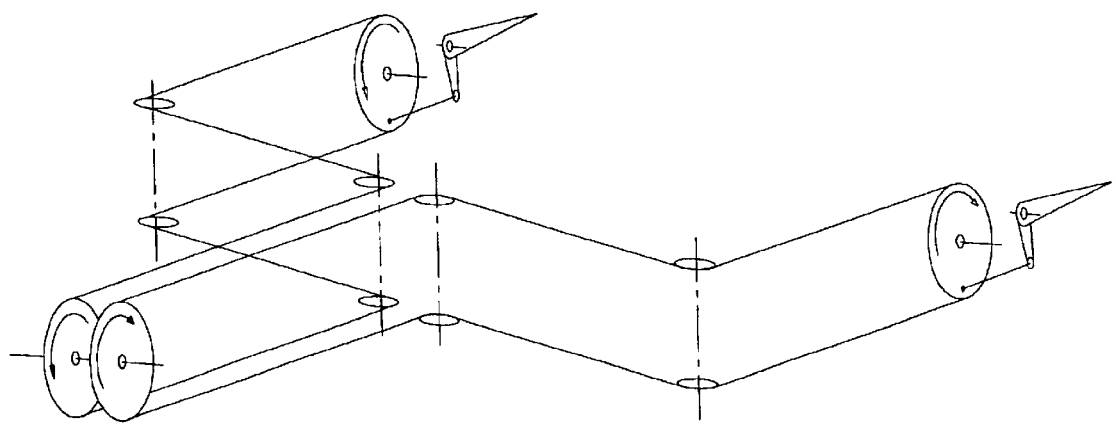
FIG. 4 presents a typical aileron control cable routing when employing the invention described in FIGS. 1 and 2.

Since in the invention presented in FIGS. 1 and 2 the axial movement of element 1 produces rotation of pulleys 5 and 6 in opposite direction, some means may have to be implemented to assure that control surfaces are deflecting in the intended direction. Various solutions may be possible, one of which is presented in FIG. 3 for an elevator control system where one of the cables is cross-routed to achieve that. This is not necessary for the aileron control system shown in FIG. 4 since left and right ailerons are moving in opposite direction by design.

FIGS. 5 and 5A present an alternate design of the driving system shown in FIGS. 2 and 9 whereby the springs 13 and 13a are replaced by springs 13c and 13d performing the same function. Element 1b however, is a modified version of element 1 incorporating either attached or integrally machined arbor 1c on each side of the fork that straddles and drives the bellcrank 2. The outside end of each arbor is splined and covered by outwardly movable cap 1d having matching internal splines. One end of said torsion spring is threaded thru a hole provided in cap 1d while the other end is resting against the bellcrank 2. By lifting, to disengage the splines, the cap can be rotated to adjust the spring pretension as desired.

FIG. 6 presents essentially the same driving system design as the one shown in FIGS. 1 and 2, except that the bellcrank 2 is operating in a plane perpendicular to the planes of the pulleys 5 and 6.

In this design a translational movement of bellcrank 2a would cause both pulleys 5a and 6a to rotate in the same direction removing a necessity of elevator crossover cable routing shown in FIG. 3, as would be the case for a design in FIG. 1. The other difference would be a necessity to install spherical bearings in joints corresponding to numbers 8 thru 11 in FIG. 2. Alternately, rod links 3a and 4a in FIG. 6 may be installed on either side of a pulley if so desired.

Figure 7:
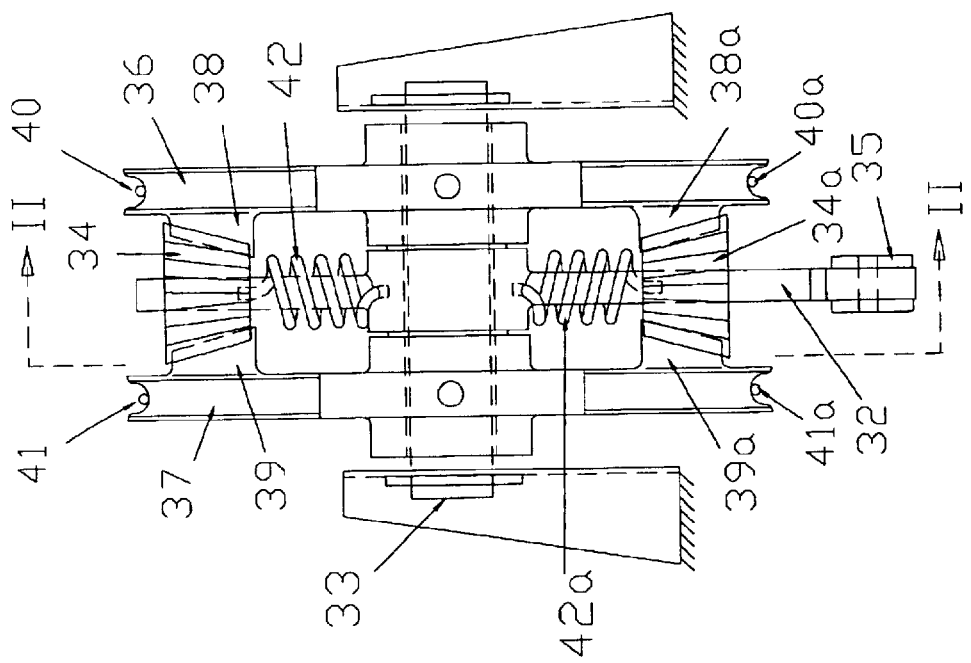
FIG. 7 presents alternate driving system for the pulleys that control the movement of the control surfaces utilizing a differential gearing system, replacing the bellcrank 2 and rod links 3 and 4 as a driving system shown in FIG. 2.
Figure 8:
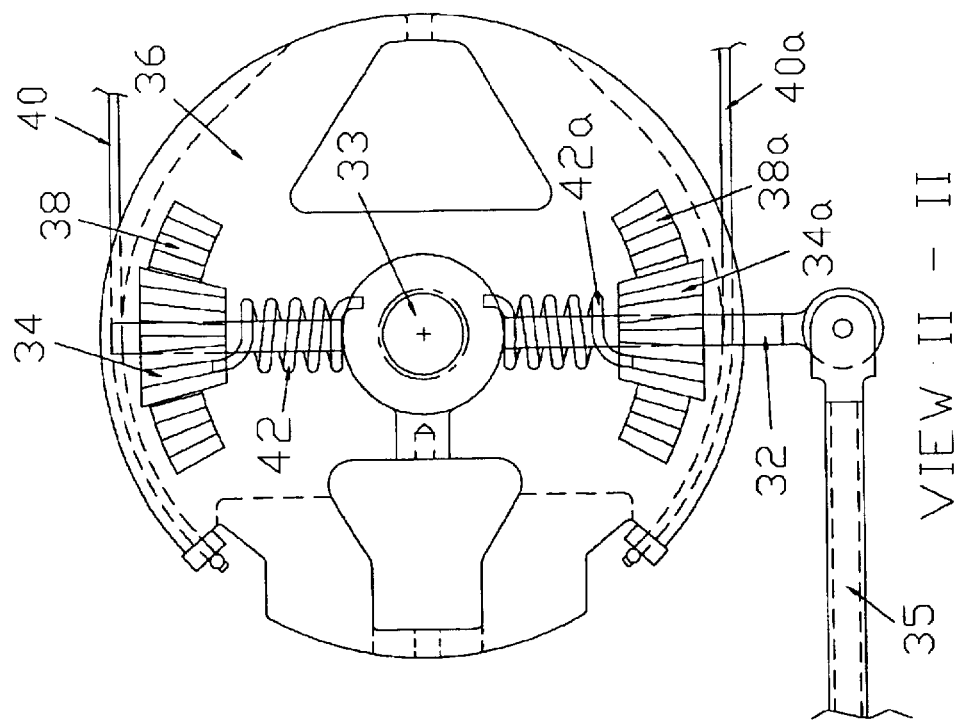
FIG. 8 presents the View II—II from FIG. 7 further detailing the differential gearing system.

FIGS. 7 and 8 present an alternate design performing the same function as described in FIGS. 1 and 2 except that the driving system operating the pulleys is different. This design utilizes a differential gearing between the pulleys and the pilot controls. Said driving system presented here includes at least elements 32, 34, and 34a. Said control input is provided by rod 35. Said support structure, in this case a shaft 32—rotatable about said axle 33, supporting two output members: the satellite pinions 34 and 34a either freely rotating or restrained by springs 42 and 42a mounted on the shaft 32—is driven by a rod 35 operated by the pilot controls either directly or by means of an actuator. Design further comprises two pulleys 36 and 37, essentially same as pulleys 5 and 6 in FIG. 1, but having integrally built (or attached) segmented bevel gears 38, 38a, 39 and 39a, on one side of each pulley 36 and 37 that mesh with the satellite pinions 34 and 34a forming said differential gearing assembly. Pulleys 36 and 37 are connected with cables 40, 40a, 41 and 41a to the left and right control surfaces in the same manner as described in FIG. 1 for pulleys 5 and 6, with the exception that the crossover cable routing as shown in FIG. 3 is not required here for elevator controls but would be required for the aileron controls.

In a normal operation and assuming that springs 42 and 42a are not utilized, when rod 35 is operated by pilot flight controls, the shaft 32 rotates together with the bevel gears 34 and 34a about the axle 33. Satellite pinions 34 and 34a, having an equal resistance against rotation from pulleys 36 and 37, would not rotate with respect to the shaft 32 but will essentially act as a wedge between the pulleys 36 and 37, forcing the pulleys and the shaft 32 to rotate together. Rotation of pulleys 36 and 37, by means of cables 40, 40a, 41 and 41a, would cause respective surfaces to move the same way as described in FIGS. 1 and 2. For any position of pilot flight controls then, if unbalance of forces between the two control surfaces occurs, deflection of the higher loaded surface would decrease forcing the pulley on that side (say pulley 36) to rotate back while the shaft 32, controlled by the pilot, remains still and unaffected. Rolling of the pulley 36 backwards would cause the satellite pinions 34 and 34a to rotate about shaft 32 forcing the opposite side pulley (in this case pulley 37) to rotate forward thus increasing the deflection until both surfaces become balanced again. By including the springs 42 and 42a into a design, the magnitude of unbalance may be moderated or even eliminated if desired by selecting corresponding spring stiffness. For illustrative purposes in the design presented here, only one torsion spring per satellite pinion is shown. An additional spring may be similarly installed on the opposite side of each said satellite pinion as well as some kind of spring preload adjustment if desired.

If one side of the control system becomes jammed for any reason, that side pulley would be essentially "locked". Pilot moving the flight controls would still be able to operate the shaft 32 in the same way since the satellite gears 34 and 34a would roll over the gear segment of the "locked" pulley, forcing the other side pulley to rotate and move its respective control surface in the pilot's intended direction without requiring any additional action by the pilot whatsoever. Control surface deflection and pilot's feel of force on controls would be the same as described earlier for the design shown in FIGS. 1 and 2.

Shaft 32 representing said support structure, instead of being driven by a rod 35, might also be driven by a cable system attached to each end of the shaft 32 if so desired. Similarly, a pulley sector, operated by cables and accommodating said satellite pinions, could replace the shaft 32 as another design of said support structure. Additionally, only one instead of two satellite pinions could perform the same function as well, providing some weight saving.

FIG. 9 presents a mechanical locking system as installed within pulley 6 and designed to prevent a loss of controls of the aircraft in the event of severance of a flight control cable. Said mechanical locking system includes a system of linkages 14, 14a, 15 and 15a; a pin 16; and a spring 17; all installed on each pulley and including one for each pulley a stationary receptacle 18 that is fixed to the aircraft structure and able to engage the pin 16 when extended. At each end of said receptacle said pulley stop is designed in the shape of a protrusion against which said pin 16 shoulders when in normal non-extended position thus limiting further rotation of said pulley. The control cables 21 and 21*a* are attached to levers 14 and 14*a* respectively. When the cables 21 and 21*a* are pre-tensioned, levers 14 and 14*a* are forced to rotate around the axis 19 and 19*a* until they shoulder against the pulley. In this position levers 14 and 14*a* by way of levers 15 and 15*a* rotatable about axis 20 and 20*a* respectively hold pin 16 in retracted position against the spring 17. Alternately, pulley stops may be introduced elsewhere rather than utilizing ether pin 16 or the receptacle 18 without departing from the spirit of the invention.

The cable system is always pre-tensioned at rigging to avoid cable sagging due to temperature change with altitude. In flight however, for any position of cockpit controls away from neutral, this pretension force in the driving cable is increased by an additional tension force required to drive the control surface, while pretension force in the non-driving cable is reduced for an equal magnitude. Assume now that pulley 6 (with cables 21 and 21*a*) is controlling the left control surface and that cable 21*a*, being a non-driving cable, is suddenly broken by an accident. Any disturbance due to lost pretension in the system, if any, will be balanced out by the other side thru pivoting of bellcrank 2 without affecting pilot controls or the flight regime at all. Both control systems will continue to operate normally so long as a tension in the driving cable 21 exists. Even though the break of non-driving cable 21*a* has released its hold on lever system 14*a*, 15*a*—the levers 14 and 15 being held by tension in cable 21 are still preventing the pin 16 from extending. Only when the flight condition requires that the cockpit control be brought back toward neutral position that the cable 21 will go slack relaxing its hold on levers 14 and 15 allowing spring 17 to push the pin 16 outward where it will engage into a hole of said stationary receptacle 18 thus locking the pulley 6 against rotation. From there on the load input coming from the pilot thru element 1 will force bellcrank 2 to pivot about point 8 (which is now held fixed by pulley 6) thus operating the right control surface thru rod 4 and pulley 5 (not shown here for clarity).

Assume now that either the driving cable 21 or both cables are being broken. The left control surface that was previously held deflected by cable 21 will now float to a neutral position by the action of the aerodynamic force. Both cables will go slack releasing the hold on lever system 14, 15, 14*a* and 15*a* and allowing pin 16—driven by the action of spring 17—to slide out and engage into a hole of receptacle 18 thus locking the pulley 6 in place. From there on the pilot will be able to control the aircraft by operating the right control surface the same way as described earlier under jammed condition.

Should a dynamics of the system be such to prevent instantaneous engagement of pin 16 into a nearest hole of receptacle 18 the feedback action from non affected side due to lost balance over bellcrank 2 as well as the pilot action to restore the flight regime after loosing one half of control force will drive the pulley 6 toward the pulley stop at which time the full control of the right side of control surface will be restored regardless of whether the pin 16 is engaged into a hole of receptacle 18 or not. At that time, if it didn't happen before, the pin will slip into a hole of receptacle 18 locking the pulley 6 in place and restoring the command of the right surface.

If a receptacle 18 with only one hole at neutral position has been chosen, the behavior of the system after non-driving cable 21*a* is broken would be the same as described earlier. If, on the other hand, the driving cable 21 or both cables are being broken, and the control system is not at neutral, the pin 16 after being released will press against the receptacle contour and rotate together with the pulley 6 until pulley stop is reached as described above. At that time the control of the right band side will be restored as long as the right control surface remains on the same side of the neutral position. When a pilot reverses the displacement of the cockpit controls by passing a neutral position, from nose up to nose down for example, and springs 13 and 13*a* are not utilized, the movement of element 1 will not operate the right control surface at once. Instead it will cause the bellcrank 2 to pivot about point 9 (since that side, by the action of aerodynamic forces, will offer now more resistance to movement than the side of free pulley 6) until pulley 6—being pulled away from the pulley stop—reaches the neutral position. At that time the pin 16 will slip into the hole of receptacle 18 locking the pulley 6 in place thus enabling full operation of the right control surface. Inclusion of springs 13 and 13*a* into a design may speed up recovery by helping to bring pulley 6 into neutral position sooner.

The advantage of a receptacle 18 with multiple holes is in restoring the full control of the non-affected control surface faster but may offset the neutral point of cockpit controls toward one side depending where the pin 16 is finally engaged. The advantage of the receptacle 18 with only one hole at neutral position is that the neutral position of cockpit control is maintained at the same place but at some point the movement of the cockpit controls will be ineffective until the pin reaches the neutral position when it will lock the pulley 6 in place and restore the command.

Considering that severance of a cable rarely, if ever, happens—either design may be acceptable as long as a recovery following the break is possible.

Installation of the mechanical locking system described herein in FIG. 9 for the pulley 6 applies to the pulley 5 as well and also for pulleys 36 and 37 of FIGS. 7 and 8. The mechanical locking system, however, is not required for a control system where a threat of discrete damage does not exist (like an aileron control system for example).

Other specific embodiments of the elements 14 thru 18, 14*a* and 15*a* which are equivalents thereof are considered within the scope of the invention described, and this invention is not limited to the specific design disclosed.

Following a normal operation, landing and parking, the aircraft control surfaces are usually fixed against movement by means of a gust lock. In this invention both control systems must to be locked in order to prevent the surface movement. That could be accomplished in at least two ways described herein.

A mechanical gust lock 24 is presented in FIG. 10. A bracket 25 and a pin guide 26 are fixed to the structure. A pivotal beam 27 able to pivot about the axis 28 is operated by cables 31 and 31*a*, or by some other connection from within the cabin. By rotating the beam 27 the pin 29 by means of link 30 would be inserted into the hole 23 within the pulley thus locking the pulley and the respective control surface against the movement provided pilot controls are also brought to a neutral position. Each pulley would have to have its own gust lock but both gust locks may be operated simultaneously with a single control from the cabin. Since locks on both pulleys have to be engaged for the system to be fully locked and assuming that springs 13 and 13*a* are not utilized, one pin may have to be a little longer than the other to engage first and with additional movement of pilot control the other pin would engage also allowing the gust lock command in the cockpit to be moved into fully locked position. This process of locking control surfaces is simplified if said springs within said driving system are utilized since, by restricting the pivotal movement of said bellcrank, the holes in both pulleys will always align with each pin simultaneously when the pilot controls are brought to a neutral position.

This design provides for positive engagement and disengagement of the gust lock without depending on a spring actuated pins of equal length that could be utilized also. The same mechanical gust lock as described herein could be utilized for pulleys 5 and 6 of FIGS. 1 and 2 as well as for pulleys 36 and 37 of FIGS. 7 and 8.

Figure 11:
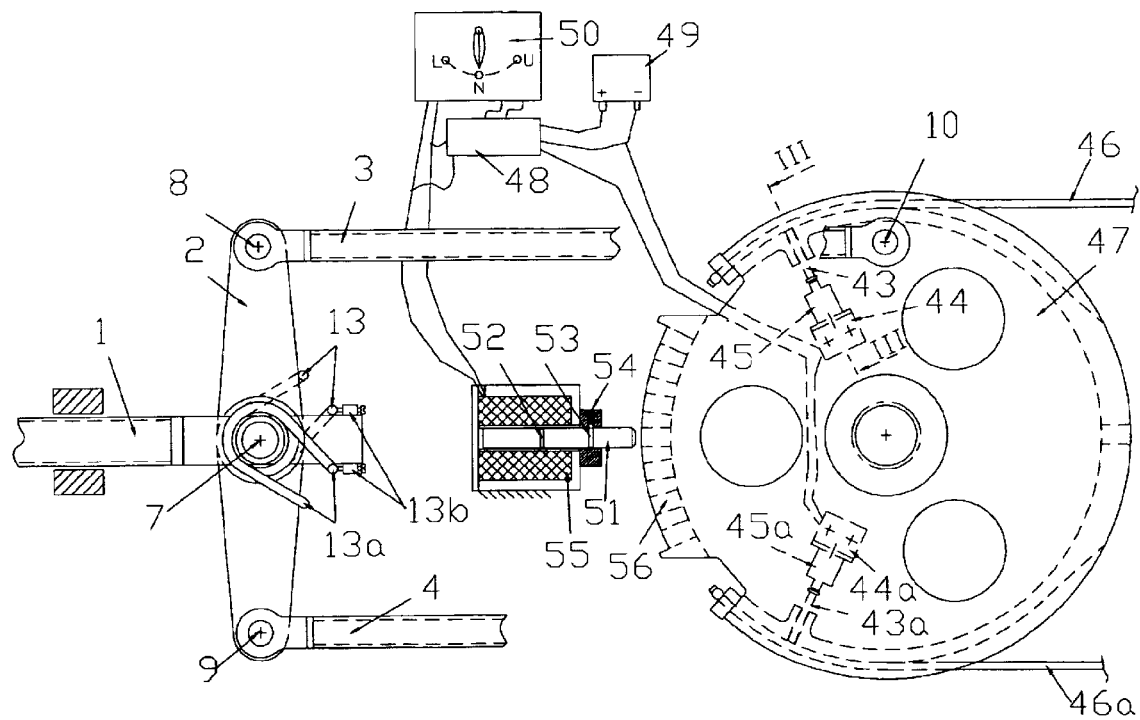
FIGS. 11 and 11A presents an electrical locking system that combines the function of the mechanical locking system shown in FIG. 9 and gust lock function of FIG. 10 into one system.
Figure 11A:
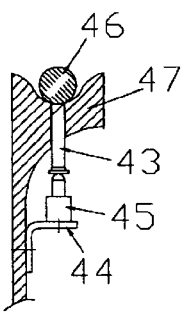

A preferred electrical locking system shown in FIGS. 11 and 11A could replace the mechanical locking system within each pulley (elements 14 thru 18, 14a and 15a in FIG. 8) and the mechanical gust lock 24 whereby only one polarized solenoid 55 for each pulley serves as a gust lock in normal operation and also locks a "free" pulley in case of a severance of a cable. The solenoid 55 representing said stationary element is fixed to the aircraft structure and positioned so that the pin 51 points toward a hole radially located on the periphery of pulley 47 when said pulley is in neutral position.

Said sensors represented here as simple switches 45 and 45a spring-loaded to on-position are supported by angles 44 and 44a and held deactivated to off-position by radially positioned rods 43 and 43a which are slidably mounted with respect to the pulley and normally held retracted within the contour of pulley's cable groove when the cables 46 and 46a are tout. When cable tension is lost rods 43 and 43a are released from being captive allowing said spring-loaded switches to push said rods radially out and spring to on-position.

In normal operation, the relay 48 is not energized and the current from the source 49 is directed toward the gust lock switch 50. To lock the surfaces a pilot brings the cockpit controls to a neutral position and turns the gust lock switch 50 to lock position L, whereby the solenoid 55 becomes energized extending the solenoid activated pin 51 into a hole within the pulley thus locking the system. Gust lock switch could be spring-loaded to a neutral position N so when desired command is complete, by releasing the switch 50, solenoid becomes disenergized. As shown in FIG. 11, pin 51 has two grooves 52 and 53 to which a spring loaded ball 54 snaps in when the pin 51 is in either extended or retracted position to safeguard a selected position against vibration or inertia forces. To unlock the gust lock, provided the energy source is activated, the gust lock switch 50 is turned to unlock position U energizing the solenoid 55 with respective polarization to retract the pin 51. When the gust lock switch 50 is released it would return to a stand-by neutral position N again.

In case of a severance of either cable 46 or 46a or both, at a point when both cables lose their tension as described earlier for the mechanical locking system of FIG. 9, they will relax the hold on rods 43 and 43a which in turn would allow the spring-loaded switches 45 and 45a to thrust them away and return to on-position thus closing the circuit and activating the relay 48. Relay 48 would then direct the current to solenoid 55 causing the pin 51 to extend against the pulley 47. Pulley 47 may optionally have either a single radially drilled hole in the neutral position on periphery of the pulley 47 or a series of additional holes within the span of travel similar to holes in receptacle 18 of FIG. 9 discussed earlier.

Further process of handling a broken cable situation is the same as described earlier for the mechanical locking system of FIG. 9. The two protrusions sticking out of contour of the pulley 47 serve as pulley stops when either protrusion shoulders against pin 51 while it is still in retracted position. Some other pulley stop designs may be utilized as well as a system of levers, similar to ones described under said mechanical locking system, which can be utilized to activate said switches instead of a design shown in FIGS. 11 and 11A without deviating from the spirit of the invention.

Figure 12:
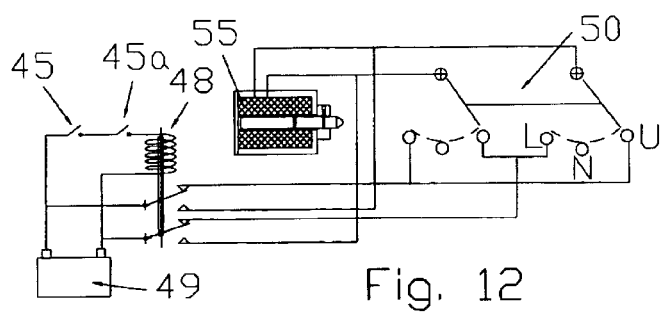
FIG. 12 presents a possible electric circuit of electrical locking system presented in FIG. 11.

FIG. 12 presents one possible electric circuit design of the electrical locking system described in FIG. 11. Those skilled in the art may utilize different sensors, include a signaling device and/or some other circuit design performing the same functions as described above without departing from the scope of the invention.

While the invention has been described here with reference to certain preferred embodiments, modes of operation, and intended applications, those skilled in the art will appreciate that various substitutions, modifications, changes and omissions may be made without departing from the spirit thereof. Thus, it is intended that the scope of the present invention be limited solely by that of the claims granted herein.

I claim:

1. A flight control system comprising:
   one cable control system operating one control surface and another cable control system operating another control surface each said cable control system including at least a driving pulley and a set of control cables operatively connected to said pulley and to said control surface, whether directly or indirectly, so that the rotation of said pulley causes rotation of said control surface, each pulley independently rotatable about a common axle;
   a driving system operatively connected to receive a control input and having output members coupled to said pulleys to produce an output causing said pulleys to rotate said control surfaces in the intended direction while at the same time if one of said pulleys experiences a resistance to rotation enables continuous and uninterrupted operation of said other pulley by said control input—and furthermore—enabling said pulleys to rotate independently of said control input when said pulleys receive forced feedback from unequal load between those two control surfaces;
   control input means operatively connected to impart motion input to said driving system to cause said driving system to produce said output.

2. A flight control system according to claim 1 wherein said driving system comprising:
   an axially movable element to which control input is imparted on one end;
   a two-arm belcrank pivotally attached to the other end of said axially movable element;
   two rod links each operatively connected between one of the arms of said bellcrank and one of said pulleys so that either the translational or a pivotal movement of said belcrank imparts a rotational movement of said pulleys.

3. A flight control system of claim 2 in which said driving system further comprising one or more springs installed between said belcrank and said axially movable element to resist a pivotal movement of said bellcrank relative to said axially movable element.

4. A flight control system according to claim 1 wherein each pulley includes a bevel gearing on its side face with geared faces of the two pulleys facing each other, and a driving system comprising:
- (A) at least one but preferably two planetary pinions located in the same plane between said two pulleys and opposite each other, enabled to rotate about their own axes and positioned to mesh with said bevel gearing of said pulleys, forming a differential gearing assembly;
- (B) a support structure on which said planetary pinion or pinions are rotatably mounted, said support structure installed between said pulleys on said axle able to independently rotate about said axle as an assembly together with said planetary pinions when receiving said control input.

5. A flight control system of claim 4 in which said driving system further comprising at least one or more springs installed between each said planetary pinion and said support structure resisting rotation of said planetary pinion relative to said support structure.

6. A flight control system according to any of the claim 3 or 5 comprising spring preload adjustment mechanism allowing selected preload of said spring or springs to be preset.

7. A flight control system according to any of the claim 2 or 4 comprising a pulley stop at each extreme of rotational travel for each pulley, a stationary receptacle installed next to the perimeter of each said pulley and a mechanical locking system installed onto each of said pulleys, said mechanical locking system on its said pulley being activated when both cable ends of said cable control system that attach to that pulley lose required tension due to severance of any one or both cables of that cable control system;
- (A) each said mechanical locking system includes:
  - (1) a pin, slidably mounted to said pulley and half way between two cable ends, guided to operate in radial direction relative to said pulley when imparted by a force so that when acted upon said pin slides radially outward to extended position;
  - (2) a spring able to impart a force on said pin by pushing against said pin and resting against the body of said pulley;
  - (3) two pivotally supported linkage systems installed symmetrically about said pin in a mirror image arrangement whereby one end of each said linkage system being connected to one control cable end and resting against the pulley when said cable tension exists, and the other end of said linkage system is resting against said pin thus barring said pin, that is being pushed by said spring, from sliding out;
- (B) said mechanical locking system being activated means said linkage systems on each side of said pin are released from being captive by said cables after said cables lose their tension, causing said linkage systems to release their hold on said pin allowing said spring to force said pin outward;
- (C) each said stationary receptacle is a block or a plate fixed to the aircraft structure and placed next to each said pulley in the plane of rotation of said pin, contoured to follow periphery of said pulley and angularly spanning at least as much as said pin would rotate with said pulley in either direction; said stationary receptacle having one or more radial holes or notches able to capture said pin when extended with said one hole or notch, or one of said multiple holes or notches, centrally located half way between two cable ends corresponding to said pulley's neutral position;
  - (1) neutral position means the position of said pulley when said control surface is in neutral position having zero deflection;
- (D) a pulley stop comprising a stationary block or blocks fixed to the aircraft structure and a pair of protrusions or at least one, either attached or integrally built into a pulley, in a position to shoulder against said stationary block or blocks when said pulley is in either extreme of rotational travel.

8. A flight control system according to any of claim 2 or 4 comprising two electrical locking systems, one each for each said pulley, at least one or more holes or notches within said pulley to which said locking system may engage and a pulley stop at each extreme of rotational travel for each pulley; said electrical locking system being activated when both cable ends of said cable control system that attach to that pulley lose required tension due to severance of any one or both cables of that cable control system;

said one or more holes or notches within said pulley being located on the periphery of said pulley or on its side and facing said electrical locking system with said one hole or notch, or one of said multiple holes or notches, centrally located half way between two cable ends corresponding to said pulley's neutral position;

neutral position means the position of said pulley when said control surface is in neutral position having zero deflection;

a pulley stop comprising a stationary element or elements fixed to the aircraft structure and a pair of protrusions or at least one, either attached or integrally built into a pulley, in a position to shoulder against said stationary element or elements when said pulley is in either extreme of rotational travel;

each said electrical locking system comprising:
- (A) two sensors wired in series, each one operatively connected to each said cable that attach to said pulley, being able to provide an output when both said cables to which said sensors are connected lose their tension;
- (B) a solenoid with solenoid operated pin having two positions: retracted and extended, depending on polarity of supplied voltage, said solenoid—fixed to the aircraft structure installed next to said pulley, in the plane of that pulley or perpendicular to said plane, with said pin pointing toward the pulley and aligned with said hole or a notch provided in said pulley when that pulley is in neutral position so that when said pin is in extended position it engages a hole in said pulley and prevents said pulley from further rotation;
- (C) a gust lock switch able to operate said solenoid to lock or unlock said pulley when the current is supplied to it;
- (D) a relay having means to redirect electric current in two ways: when not energized said relay supplies the current to said gust lock switch; and when energized, by receiving an output from said sensors, said relay supplies the current to said solenoid with polarity required to extend said pin and lock said pulley in place;
- (E) an electric circuit including at least said solenoid, said sensors, said gust lock switch, said relay and a source of direct current, whereby some other electronic circuitry may be added if selected sensors can not operate within the circuit of said solenoid.

9. A flight control system according to any of claim 2 or 4 wherein a mechanical gust lock, fixed to the aircraft structure and able to receive a control input, is installed next to each said pulley and located in plane of said pulley—or perpendicular to said plane—so that when activated by said control input said mechanical gust lock would engage said pulley by means of a hole or a notch provided for within said pulley and located opposite said mechanical gust lock when said pulley is in neutral position thus securing a positive locking of that flight control system; a reversal of said control input disengages said mechanical gust lock thus unlocking said flight control system;

neutral position means the position of said pulley when said control surface is in neutral position having zero deflection;

control input means operatively connected to impart motion input to said beam to cause said beam to pivot;

said mechanical gust lock comprising:
(A) a pivotally supported beam,
(B) a pin supported by a pin guide allowing axial movement of said pin,
(C) a link operatively connected to said beam and said pin so that when said beam pivots it causes said pin to slide.

10. A flight control system according to any of claim 2 or 4 comprising two electrical gust locks, one each for each said pulley, said electrical gust locks when activated by gust control switch would engage said pulley by means of a hole or a notch provided for within said pulley and located opposite said electrical gust lock when said pulley is in neutral position, thus locking said flight control system;

said electrical gust lock comprising:
(A) a solenoid with solenoid operated pin having two positions: retracted and extended, depending on polarity of supplied voltage, said solenoid—fixed to the aircraft structure installed next to said pulley, in the plane of that pulley or perpendicular to said plane, with said pin pointing toward the pulley and aligned with a hole or a notch provided in said pulley when that pulley is in neutral position so that when said pin is in extended position it engages said pulley's hole or notch and prevents said pulley from further rotation;
(B) a gust lock switch able to operate said solenoid to lock or unlock said pulley when the current is supplied to it;
(C) an electric circuit including said solenoid, said gust lock switch and a source of direct current.

* * * * *